May 2, 1967 M. P. GASSMAN 3,317,252
PRESSURE MODULATING HYDRAULIC CONTROL VALVE
Filed Dec. 28, 1964

INVENTOR.
M. P. GASSMAN
BY
John N. Nolan
ATTORNEY

 3,317,252
PRESSURE MODULATING HYDRAULIC CONTROL VALVE
Max P. Gassman, Waterloo, Iowa, assignor to Deere & Company, Moline, Ill., a corporation of Delaware
Filed Dec. 28, 1964, Ser. No. 421,375
10 Claims. (Cl. 303—54)

This invention relates to fluid pressure control valves and more particularly to an improved pressure modulating type hydraulic control valve for a power brake system or the like.

In certain vehicle brake systems, conventional hydraulic brakes are actuated by fluid pressure supplied by a constant pressure source, the flow of fluid under pressure to the brakes being controlled by a manually operated valve. It has been found desirable to provide such a valve with a pressure modulating feature whereby the amount of pressure delivered through and maintained by the valve is proportionate to the amount of manual movement applied to open the valve. This feature gives the operator the proper "feel" during the power application of the brakes.

Heretofore, the modulation has been accomplished by applying the manual movement to open the valve through a helical compression type spring. After the valve opens, the spring deflects under an increasing force created by the increasing outlet fluid pressure acting on an area of the valve, whereby the valve closes when the pressure reaches a point where the resulting force sufficiently compresses the spring to allow closure of the valve. The outlet pressure is maintained at the value it reaches when the valve closes until additional manual movement is applied to again open the valve, whereby the same sequence is repeated.

However, it has been discovered that the modulating feature has produced vibrations in the modulating spring, causing the valve to emit an objectionable squeal. The present invention provides for a novel modulating spring means which eliminates the objectionable vibration and valve noise.

Accordingly, the principal object of the present invention is to provide a hydraulic pressure modulating control valve which does not produce valve squeal. A further object is to eliminate the valve squeal by providing the valve with a novel modulating spring means which includes means for damping the spring vibrations.

Another object is to provide such spring means in the form of a plurality of stacked disk springs with flat washers interspersed between the disk springs to provide internal spring friction for vibration damping.

Still another object is to provide such spring means of simple and durable construction, easy to manufacture and assemble, and of easily variable stiffness.

These and other objects will become apparent from the following detailed description and accompanying drawings wherein.

Figure 1:
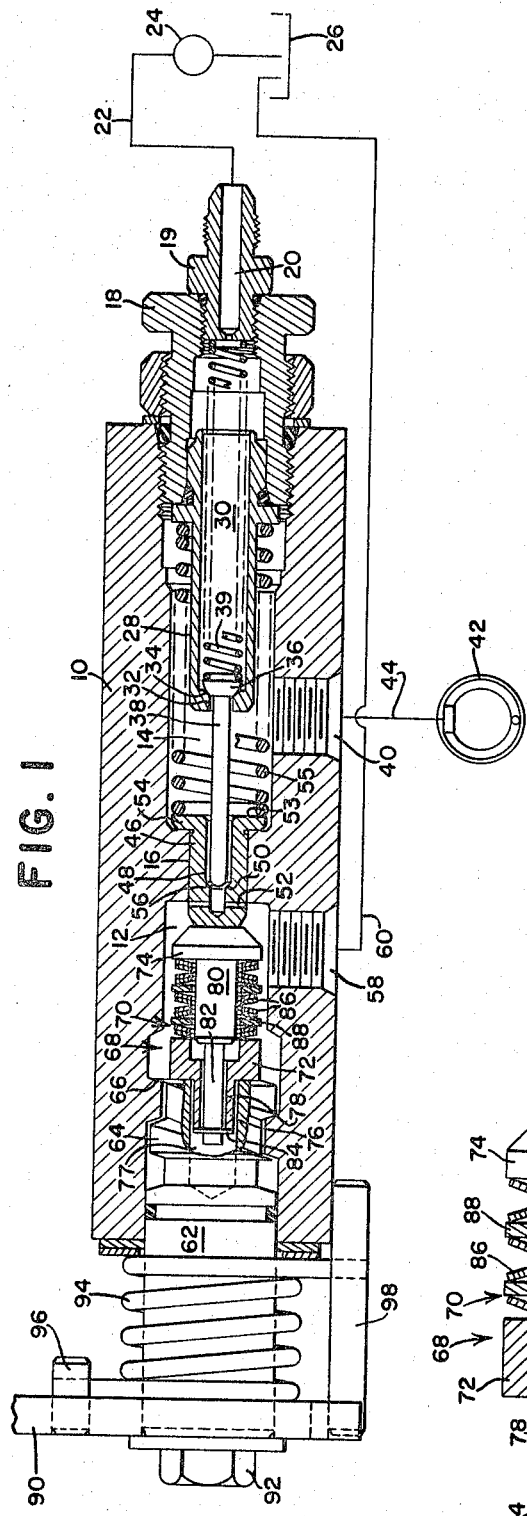
FIG. 1 is a longitudinal central section through the control valve with the valve in closed position, and including a typical brake system illustrated schematically.

The valve structure chosen to illustrate the invention comprises a housing 10 having coaxial bores 12 and 14 respectively extending from the front and rear ends thereof and interconnected by a coaxial bore 16. It is to be understood that terms such as "front," "rear," etc., are used as words of convenience and not as limiting terms.

The exterior end of the rear bore 14 (right hand bore as seen in the drawing) is threaded and receives a cylindrical threaded fitting 18 which coaxially carries an adapter fitting 19 at its exterior end having a central passage 20 communicating with a high-pressure line 22, which is connected to a source of fluid pressure including a pump 24 and a reservoir 26. A cup-shaped valve member 28 is coaxially mounted in the interior end of the fitting 18 and forms a high-pressure chamber 30 communicating with the passage 20. The front end of the valve member has a high-pressure outlet 32 connecting the chamber 30 to the bore 14 and including a valve seat 34.

A valve 36 having a valve stem 38 substantially smaller in diameter than the outlet opening 32 and coaxially inserted through the outlet opening, is biased against the valve seat 34 by a helical compression spring 39 acting within the chamber 30 to normally close the opening. When the valve is opened by axially moving the valve to the rear (to the right as shown here), pressure is transmitted to the bore 14 and thence through the brake outlet 40 to a brake 42 via a brake line 44.

A piston 46 is mounted in the bore 16 and has an axial bore 48 extending from the rear end and including a valve seat 50 formed by a reduced bore diameter, the bore 48 normally communicating with the front bore 12 by means of radial passages 52 in the piston 46. The piston 46 includes a rear face 53 having a shoulder 54 around its periphery, the front edge of the shoulder being biased against the front (left) end of the bore 14 by a helical compression spring 55 acting within the bore 14.

The valve stem 38 is substantially smaller in diameter than the larger diameter of the bore 48 into which it is inserted, the front end of the stem forming a valve 56 which engages the valve seat 50 to close the valve when the piston 46 moves toward the rear, thereby sealing the bore 14 from the bore 12. In normal position (FIG. 1), when the brake 42 is not actuated, the valve 36 is closed and the valve 56 is open for exhaust of the fluid pressure from the brake via the bore 14, the valve 56 and the passageways 52 and the bore 12 and thence to the reservoir 26 via a brake return outlet 58 in the housing and a brake return line 60.

The valve is actuated by axially moving the piston 46 toward the rear (right), first closing the valve 56 and thereafter moving the valve stem 38 to open the valve 36.

Figure 3:
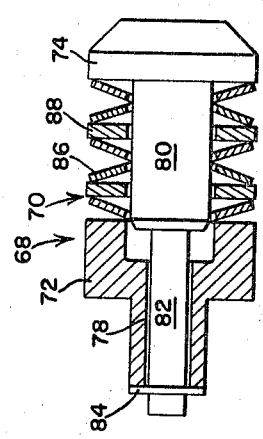
FIG. 3 is a longitudinal section of the modulating spring showing a slightly different arrangement of the components.

A shaft 62 having an external screw 64 at its rear end engages an internal thread 66 in the bore 12 for axial movement of the shaft in response to a torque on the shaft. The axial movement of the shaft is transmitted to the piston 46 to actuate the valves through a modulating means indicated generally by the numeral 68 and including spring means 70 interposed between front and rear retaining members 72 and 74. The cylindrical front retaining member 72 seats against the rear end of the shaft 62 and has a shank portion 76 of reduced diameter inserted in an axial bore 77 at the rear end of the shaft 62, and the retaining member 72 also includes an axial bore 78. The cylindrical rear retaining member 74 seats against the front end of the piston 46, and has a guide portion 80 of reduced diameter on which the spring means 70 is mounted, and a shank portion 82 of further reduced diameter extending through the bore 78. A locking means 84 on the shank portion 82 permits relative axial movement of the retaining members from normal positions toward the other member only, thereby permitting only compression of the spring means 70. The spring means comprises a plurality of washer-like concavo-convex disk spring 86 and a plurality of flat washers 88 coaxially mounted on the guide portion 80 of the retaining member 74, the guide portion extending through the central apertures of the disk springs and the washers. In the embodiment shown in FIGS. 1 and 2, the disk springs are mounted in pairs formed by adjacent disks concave in the same direction, each pair being concave in the direction opposite to the adjacent pair, with a flat washer interposed between the pairs concave to each other. In the embodiment of the modulating spring means 70 shown in FIG. 3, the disk springs 86 are coaxially mounted, alternating the direction of concavity, with a flat washer 88 being interposed between adjacent disk springs which are concave toward each other.

The friction between adjacent disk springs, between the disk springs and the washers, and between the disk springs and retaining members of the spring compresses supplies a damping force whereby spring vibrations are damped, the washer performing the function of increasing the internal friction of the spring means 70.

The torque on the shaft 62 necessary to axially move the shaft is manually applied through a radial lever arm 90 affixed to the front end of the shaft by a bolt 92. The shaft is rotated in a counterclockwise direction to axiallly move the shaft toward the rear of the valve against the bias of a helical torsion spring 94 mounted around the shaft and having one end engaging a pin 96 projecting from the lever arm 90 and the other end engaging a stop pin 98 attached to the housing 10. The stop pin 98 also projects into the path of the lever arm to prevent its clockwise rotation, the spring 94 biasing the lever arm against the stop pin 98 to establish the normal position of the lever arm and consequently the shaft 62 which actuates the valve.

The normal positions of the components are shown in FIG. 1, the modulating means extending its maximum length between the shaft 62 and the piston 46 which is held in its forward position whereby the valve 56 is open for return of the fluid pressure to the reservoir 26, the high-pressure valve 36 being closed.

When the lever arm is manually turned in a counterclockwise direction against the bias of the spring 94 to actuate the valve, the shaft 62 moves to the rear (right), thereby forcing the modulating means 68 rearwardly. The modulating spring means 70 is stiffer than the combined springs 39 and 55 and, therefore, the modulating means 68 does not initially compress. Thus, the entire motion of the shaft is transmitted to the piston 46. The rearward motion of the piston 46 first closes the valve 56, sealing the high-pressure side from the low-pressure side, and after engaging the valve stem 38, it moves the valve 36 rearwardly to open the high-pressure valve.

The pressure in the bore 14 acting on the rear piston face 53 creates a forwardly directed axial force on the piston. When this force plus the axial forces exerted by the springs 39 and 55 equals the force necessary to deflect the modulating spring 70, the valve is in a balanced condition. Additional fluid pressure will cause compression of the modulating spring 70 to increase the force exerted by the spring to maintain the opposite forces in balance, the compression of the modulation means allowing the forward movement of the piston 46 and valve 36. If the lever arm 90 and consequently the shaft 62 and the piston 46 were moved only a relatively short distance, a small amount of modulating spring compression will cause closure of the valve 36, whereby the fluid pressure will only build up to a relatively low value. Conversely, if the lever arm movement and consequently the shaft and piston axial movement are relatively large, the fluid pressure must be relatively high to exert a sufficient force to compress the modulating spring 70 the necessary distance to allow closure of the valve. Partial release of the lever arm will allow forward movement of the compressed modulating means 68 and consequently the piston will move forwardly, reducing the pressure in bore 14 until the balance is returned. Since the amount of fluid pressure built up and maintained in the bore 14 and consequently in the brake 42 is directly dependent on the manual movement of the lever arm 90, the operator has a proper "feel" during the braking operation.

Figure 2:
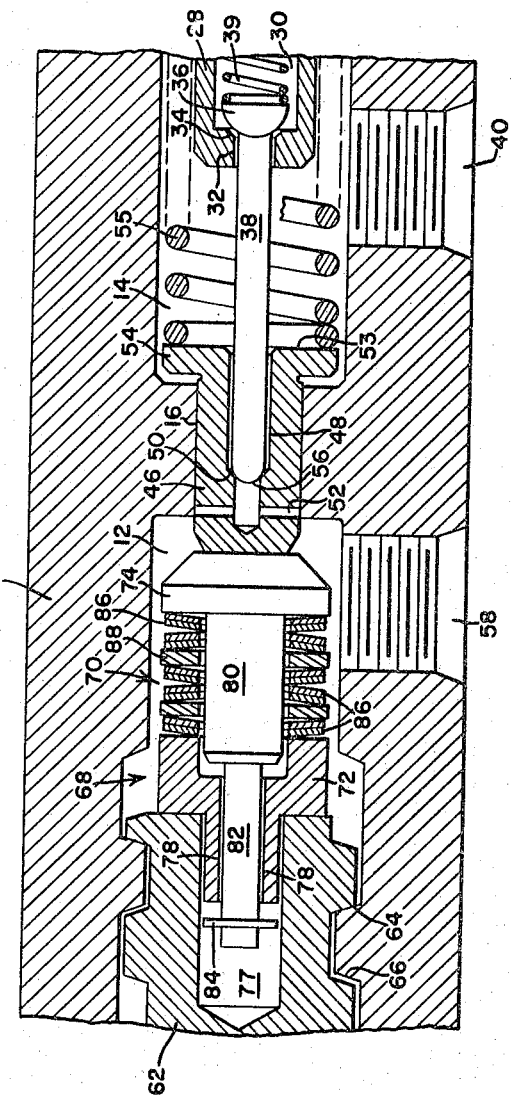
FIG. 2 is an enlarged sectional view similar to FIG. 1 of a portion of the valve with the valve in an open position.

When the valve is in a balanced condition as shown in FIG. 2, the piston 46 is axially supported between opposite deflected springs. In this position, it is very susceptible to both forced and free harmonic vibrations. However, if the components vibrate axially, alternately compressing and expanding the modulating spring means 70, the edges of the disk springs will move radially against the washers 88 and the retaining members 72 and 74 creating a frictional damping force which effectively dampens the vibrations. Additional damping force is also provided by the friction between the inside diameter of the disk springs 86 and washers 88 and the outside diameter of the guide member 80 when there is a relative axial movement.

The stiffness of the modulating spring means 70 is easily variable by replacing one or more of the disk springs with stiffer or more flexible disks, or by changing the relative positions of the disks. However, it is generally desirable that the flat washers 88 be placed adjacent to the concave side of the disk springs to provide maximum damping friction.

Although only two arrangements of the relative positions of the disk springs and washers are shown, other arrangements may be effectively utilized within the scope of the present invention. Moreover, other features and advantages of the present invention will readily occur to those skilled in the art, as will many modifications and alterations in the preferred embodiment of the invention described herein, all of which may be achieved without departing from the spirit and the scope of the invention.

What is claimed is:

1. In a pressure-modulated hydraulic control valve of the type having valve means manually actuated through modulating means compressible along the axis of movement, the combination therewith of an improved compression spring means for resisting said modulating means compression comprising a plurality of axially alined concave disk springs adjacently mounted in said modulating means for axial compression along said axis of motion, at least one of said springs being concave in the opposite direction from the remainder.

2. In a pressure-modulated hydraulic control valve of the type having valve means manually actuated through modulating means compressible along the axis of movement, the combination therewith of an improved compression spring means for resisting said modulating means compression comprising a plurality of axially alined concave disk springs and at least one flat disk axially alined and interspersed with said disk springs, the disk springs and flat disk being stacked and mounted in said modulating means for axial compression of the stack along said axis of motion whereby the effective length of the modulating means is compressible.

3. The invention defined in claim 2 wherein each flat disk is adjacent the concave side of a disk spring, the edge of the disk spring moving radially against the adjacent flat disk face when the spring means compresses.

4. In a pressure-modulated hydraulic control valve of the type having valve means manually actuated through modulating means compressible along the axis of movement including opposite retaining members movable toward each other along said axis of movement, the combination therewith of an improved modulating spring means for resisting said modulating means compression comprising a plurality of stacked axially alined concave disk springs and a plurality of flat disks axially alined and interspersed with said concave disk springs, each flat disk being adjacent the concave side of a disk spring whereby the edge of the disk spring moves radially against the adjacent flat disk face when the spring means compresses, the spring means being interposed between said opposite retaining members for axial compression along said axis of movement when the retaining members move toward each other.

5. In a pressure-modulated hydraulic control valve of the type having valve means manually actuated through modulating means compressible along the axis of movement, including opposite retaining members movable toward each other along said axis of movement and an axial guide member between the retaining members, the combination therewith of an improved modulating spring means comprising a plurality of axially alined concave disk springs having a central aperture slidably stacked on said guide member, and at least one flat disk having a central aperture axially alined and interspersed with said disk springs on said guide member, the guide member extending through said apertures, the spring means being interposed between the retaining member and being compressible along said axis of movement to allow relative movement of the retaining members toward each other.

6. The invention defined in claim 5 wherein each flat disk is adjacent the concave side of a disk spring, the edge of the disk spring moving radially against the adjacent flat disk space when the spring means compresses.

7. The invention defined in claim 6 wherein adjacent disk springs are concave in opposite directions, and a flat disk is interposed between adjacent disk springs concave to each other.

8. The invention defined in claim 5 wherein the disk springs are mounted in pairs, the spring in each pair being concave in the same direction, and adjacent pairs being concave in opposite directions, and a flat disk is interposed between adjacent pairs concave to each other.

9. In a fluid-pressure control valve of the type having a high-pressure inlet side and a lower-pressure outlet side separated by normally closed manually actuated valve means, the combination therewith of improved modulating means through which the valve is actuated comprising, oppositely disposed retaining members movable toward each other along the axis of actuating movement, one of said members having an axial bore, a cylindrical guide member axially extending between said members and slidable in said bore, a plurality of axially alined concave disk springs having axial bores of substantially the same diameter as said guide member, slidably mounted thereon, a number of said disk springs being concave in an opposite direction from the others, a plurality of flat washers slidably mounted on said guide member and interspersed among said disk springs, each washer being adjacent the concave side of a disk spring, the disk springs and flat washers being stacked on said guide member to form spring means compressible along said axis of movement with opposite ends seating against the opposite retaining members, the spring means compressing under increasing outlet pressure when the valve is open to allow movement of the retaining members toward each other whereby the effective length of the modulating means is decreased to cause closure of the valve at a predetermined pressure.

10. In a pressure-modulated hydraulic control valve of the type having valve means manually actuated through modulating means compressible along the axis of movement, including opposite retaining members movable toward each other along said axis of movement and an axial guide member between the retaining members the combination therewith of an improved modulating spring means comprising a plurality of axially alined concave disk springs having a central aperture substantially conforming to the guide member cross section and slidably mounted thereon, a plurality of said disk springs being concave in an opposite direction from the others, a plurality of flat disks having substantially the same diameter as said disk springs and also having a central aperture conforming to the guide member cross section slidably mounted thereon, the flat disk being interspersed with said disk springs, each flat disk being adjacent the concave side of the disk spring, the disk springs and flat disk being stacked on said guide member to form compression spring means interposed between said retaining members, the edge of the disk springs moving radially against the adjacent flat disk as the spring means compresses whereby the friction of said movement produces a vibration damping force.

No references cited.

EUGENE G. BOTZ, *Primary Examiner.*